United States Patent
Tirumala (10) Patent No.: US 8,281,275 B2
(45) Date of Patent: Oct. 2, 2012

(54) REDUCING LEAKAGE POWER IN INTEGRATED CIRCUIT DESIGNS

(75) Inventor: Sridhar Tirumala, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/220,603

(22) Filed: Aug. 29, 2011

(65) Prior Publication Data
US 2012/0131531 A1    May 24, 2012

Related U.S. Application Data

(60) Provisional application No. 61/415,764, filed on Nov. 19, 2010.

(51) Int. Cl.
G06F 9/455 (2006.01)
G06F 17/50 (2006.01)

(52) U.S. Cl. ........ 716/133; 716/108; 716/109; 716/113; 716/132; 716/134

(58) Field of Classification Search .................. 716/106, 716/108, 109, 111–115, 132–135
See application file for complete search history.

(56) References Cited

U.S. PATENT DOCUMENTS

| | | | |
|---|---|---|---|
| 2006/0010413 A1* | 1/2006 | Curtin et al. | 716/9 |
| 2007/0180415 A1* | 8/2007 | Pundoor | 716/6 |
| 2008/0168406 A1* | 7/2008 | Rahmat et al. | 716/2 |
| 2008/0320420 A1* | 12/2008 | Sferrazza | 716/2 |
| 2010/0031217 A1* | 2/2010 | Sinha et al. | 716/10 |
| 2010/0050139 A1* | 2/2010 | Abadir et al. | 716/5 |
| 2010/0153897 A1* | 6/2010 | Zahn | 716/9 |
| 2010/0169847 A1* | 7/2010 | Gupta et al. | 716/2 |
| 2010/0262939 A1* | 10/2010 | Zahn et al. | 716/2 |
| 2011/0209113 A1* | 8/2011 | Rahmat et al. | 716/133 |

OTHER PUBLICATIONS

Liu, Y. et al., "A New Algorithm for Simultaneous Gate Sizing and Threshold Voltage Assignment," IEEE Transactions on Computer-Aided Design of Integrated Circuits and Systems, Feb. 2010, pp. 223-234, vol. 29, No. 2.

Nguyen, D. et al., "Minimization of Dynamic and Static Power Through Joint Assignment of Threshold Voltages and Sizing Optimization," Proc. Int.Symp. Low Power Electron. Design, ISLPED '03, ACM, Aug. 25-27, 2003, pp. 158-162.

* cited by examiner

*Primary Examiner* — Jack Chiang
*Assistant Examiner* — Nha Nguyen
(74) *Attorney, Agent, or Firm* — Fenwick & West LLP (57) ABSTRACT

A method for reducing leakage power of an IC during the design of the IC. A cell based IC design is received that includes a plurality of signal paths with positive slack. The positive slack is converted to negative slack by replacing cell instances in the IC design with footprint equivalent variants of the cell instances. The negative slack is converted back to positive slack via an iterative path-based analysis of the IC design. In each iteration, a path is selected that has negative slack and replacement values are computed for cell instances in the path. One or more cell instances in the path are then replaced with variants based on the replacement values.

18 Claims, 9 Drawing Sheets

REDUCING LEAKAGE POWER IN INTEGRATED CIRCUIT DESIGNS

CROSS-REFERENCE TO RELATED APPLICATIONS

This application claims priority under 35 U.S.C. §119(e) to U.S. Provisional Patent Application Ser. No. 61/415,764, "Recovery of Leakage Power Without Affecting QOR Metrics of IC Design," filed Nov. 19, 2010. The subject matter of all of the foregoing is incorporated herein by reference in their entirety.

BACKGROUND

1. Field of Art

The disclosure generally relates to the field of electronic design automation (EDA), and more specifically to reducing leakage power in Integrated Circuit (IC) Designs.

2. Description of the Related Art

Leakage power contributes significantly to the total power of modern ICs. Further, leakage power is a dominant contributor for consuming stand-by power. Many sources of leakage can be traced to the transistors of an IC. For example, gate-oxide tunneling leakage, sub-threshold leakage, punch-through leakage, gain-induce drain leakage and reverse bias leakage are different types of leakage currents found in modern Metal Oxide Field Effect Transistors (MOSFET). Power leakage can be reduced by increasing the threshold voltage or increasing the gate length of the transistors. However, techniques for decreasing power leakage also have the negative consequence of increasing the delay of the transistor.

Additionally, most modern ICs are cell based designs designed from standard cells. The standard cell is a circuit that has been pre-designed and pre-verified as a building block for a design. Examples of standard cells include NAND gates, NOR gates, flip flops, and other logic functions. During the process of designing an integrated circuit, a designer may select particular cells from a library of cells and use them in creating a design for an IC. Copies of the cells (called instances) are then arranged into a floor-plan and then connected together with chip-level metal routing to implement a desired functionality of the IC.

A cell library includes different footprint equivalent variants for various types of cell. For example, a cell library may include three versions of a NOR gate: a low leakage variant, a medium leakage variant, and a high leakage variant. Because of the inverse relationship between leakage and delay, the low leakage variant typically has the highest delay, and the high leakage variant has the lowest delay. Footprint equivalent variants can be interchanged with other variants of the same type of cell without affecting the chip-level routing between cells. Thus, the leakage of an IC design can be reduced without affecting the routing of the design. However, minimizing leakage comes at the expense of decreasing the overall speed of the IC.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

Configuration Overview

Embodiments of the present disclosure relate to reducing leakage power for an IC design. In one embodiment, the cell based IC design includes cell instances that form signal paths through the IC design. An EDA tool determines slack values for the signal paths, some of which have positive slack. For example, a path may have positive slack if it meets timing requirements specified for the circuit design and negative slack if it violates the timing requirements. To convert the positive slack into negative slack, thereby causing the circuit design to violate the timing requirements, a plurality of cells instances in the IC design are replaced with variants of the IC design. In one embodiment, a set of footprint equivalent cell variants may exist for each cell instance, and each cell instance is replaced with a pivot variant that corresponds to a discontinuity in a delay-leakage plot for the set of variants.

Timing violations created by the initial replacement are rectified by converting the negative slack back to positive slack. In one embodiment, the negative slack is converted back to positive slack with an iterative path based analysis. In each iteration, a path is selected that has negative slack. Replacement values are computed for a plurality of cell instances in the path. One or more cell instances in the path are then replaced based on the replacement values. Correcting the timing violations with a path based analysis is beneficial for minimizing the power leakage of the overall IC design while also eliminating the timing violations. The resulting circuit design is then output.

Computing Machine Architecture

Figure 1:
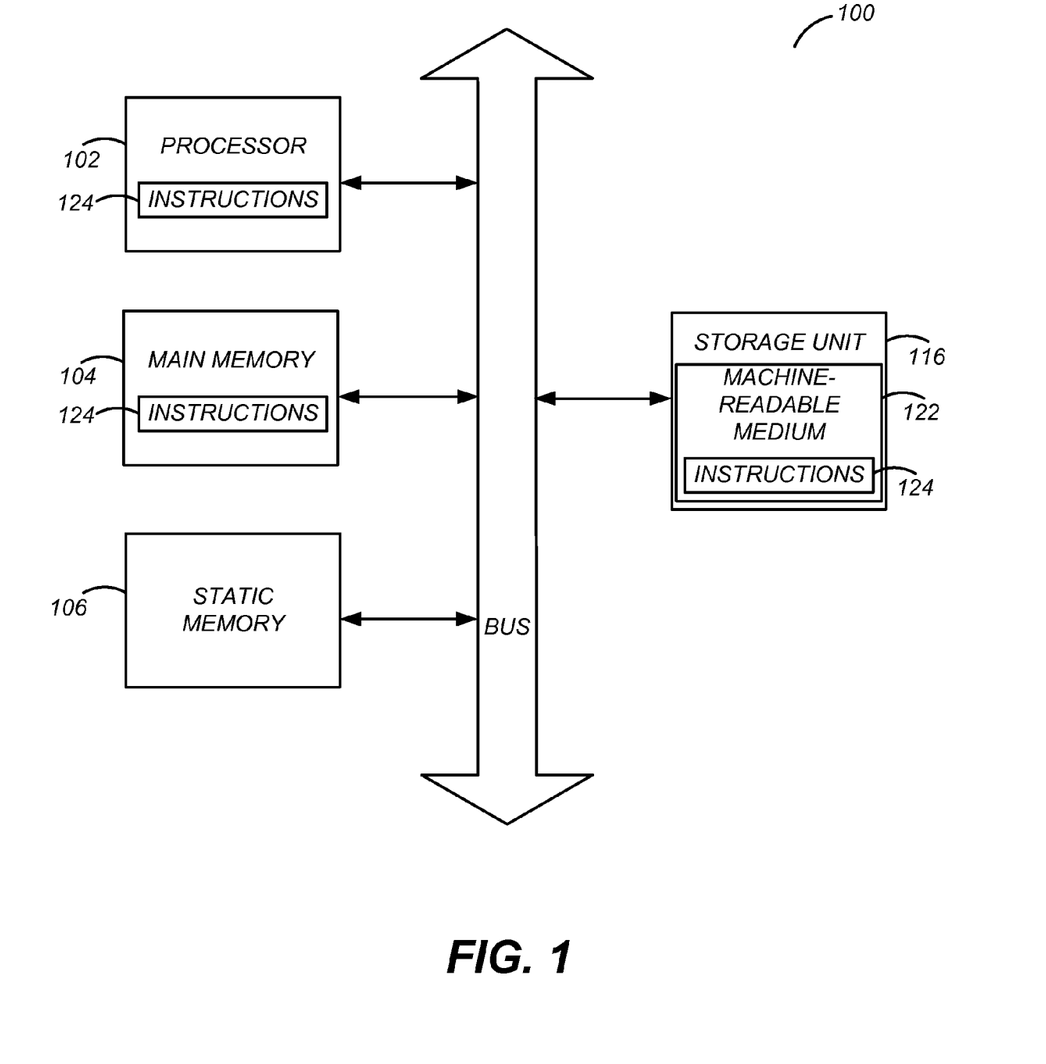
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), a main memory 104, a static memory 106, and a storage unit 116 which are configured to communicate with each other via a bus 108. The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 2:
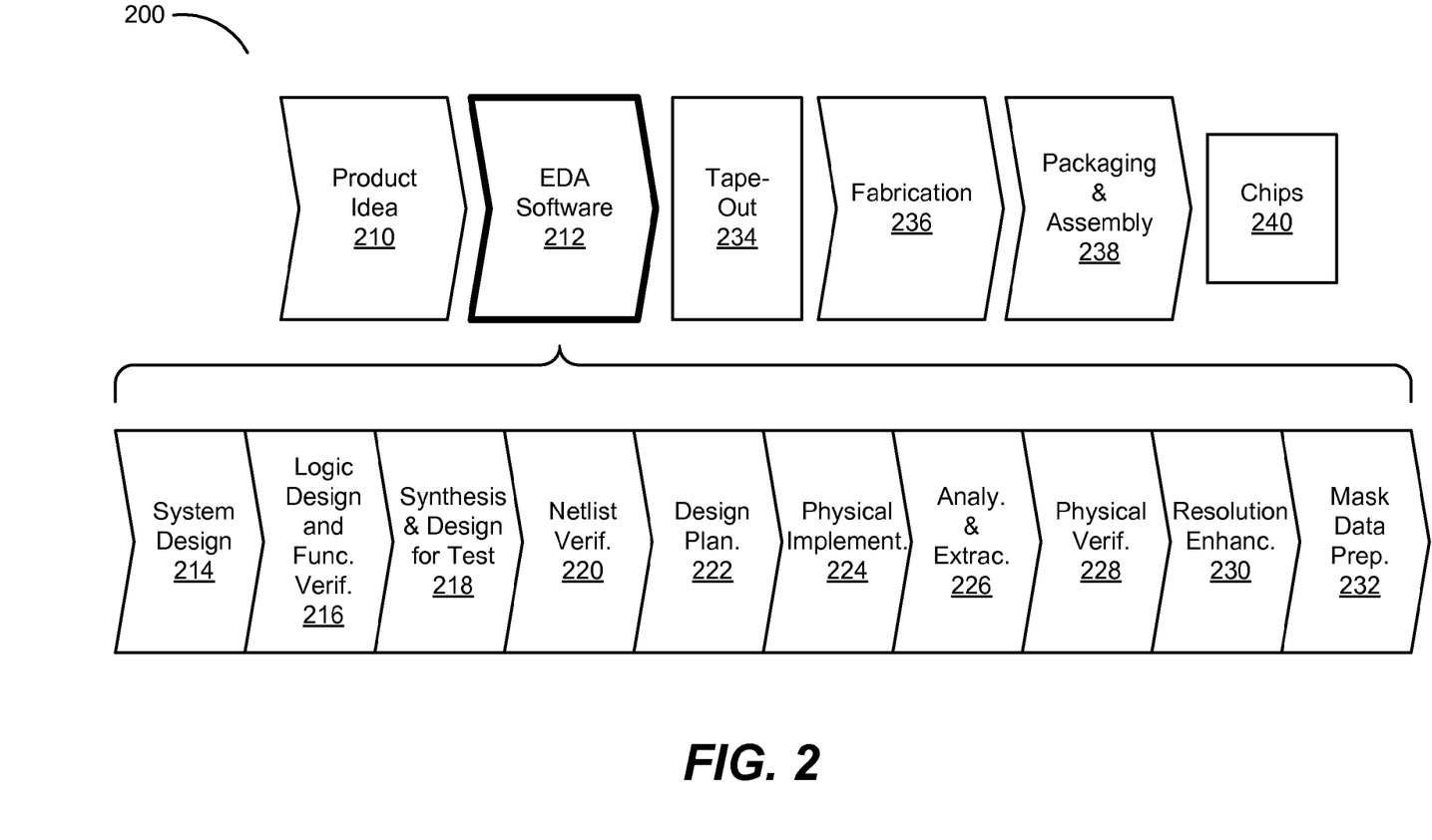
FIG. 2 is one embodiment of a flowchart illustrating various operations in the design and fabrication of an integrated circuit.

FIG. 2 is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished chips 240.

The EDA software 212 may be implemented in one or more computing devices such as the computer 100 of FIG. 1. For example, the EDA software 212 is stored as instructions in a computer-readable medium which are executed by a processor for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber® and System Studio® products.

During logic design and functional verification 216, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, Magellan®, Formality®, ESP® and Leda® products.

During synthesis and design for test 218, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments, the present disclosure relates to a postoptimization process that occurs after physical implementation 224 for reducing the leakage power of an IC design while maintaining the operational speed of the IC design.

Breaking and Recovering Timing

Figure 3A:
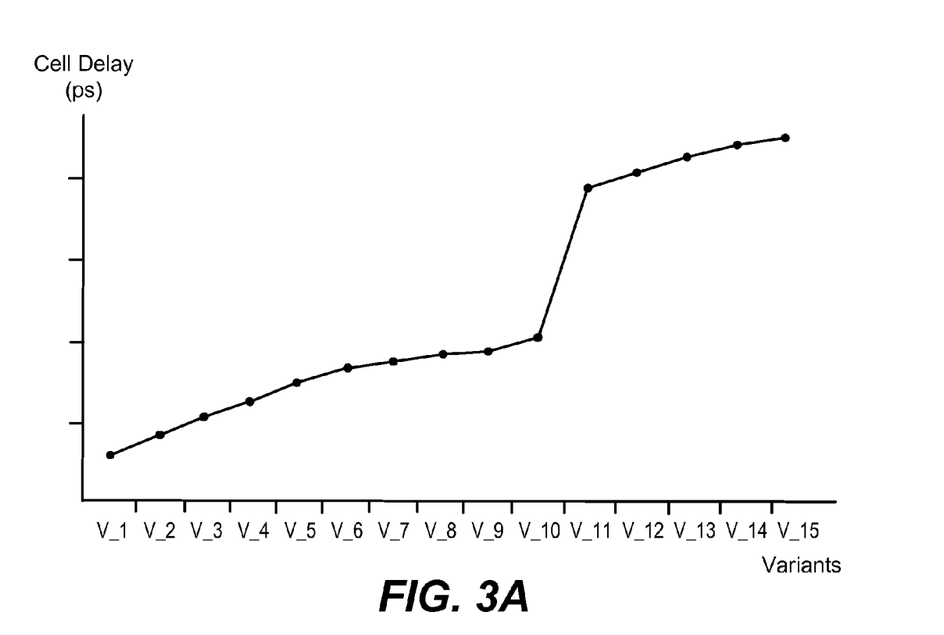
FIG. 3A illustrates one embodiment of a delay curve for a standard cell with fifteen variants.

Turning now to FIG. 3A, illustrated a delay curve for fifteen variants of a standard cell according to an embodiment. For example, the standard cell represented by this delay curve may be a NOR gate, and each variant is a different implementation of the NOR gate with a different amount of delay. Fifteen different variants of the standard cell, V_1 through V_15, are displayed along the X-axis of the graph. The Y-axis represents the propagation delay associated with each cell variant. As shown, the lower number variants (e.g., V_1) generally have a lower amount of delay than the higher numbered variants (e.g., V_15). In some embodiments, the variants differ by the threshold voltages (Vt) or gate length of the transistors in the variants, which causes the variants to have differing delay and leakage characteristics.

Figure 3B:
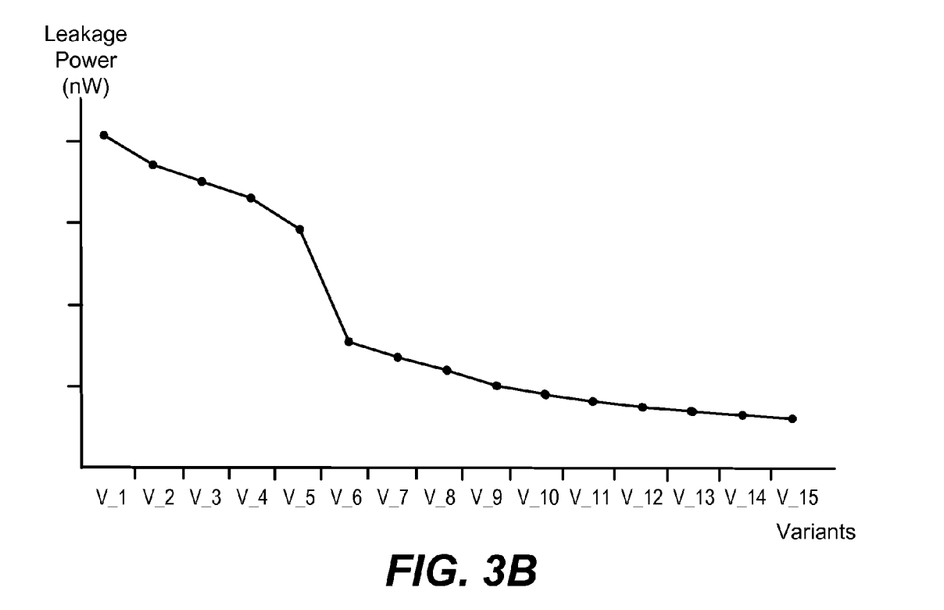
FIG. 3B illustrates one embodiment of a leakage curve for a standard cell with fifteen variants.

Referring now to FIG. 3B, illustrated is a power leakage curve for the fifteen cell variants of FIG. 3A according to an embodiment. As shown, the fifteen different variants of a standard cell, V_1 through V_15, are displayed along the X-axis of the graph. The Y axis represents the amount of leakage power for each cell variant. The lower number variants (e.g., V_1) generally have a higher amount of leakage power than the lower numbered variants (e.g., V_15). When viewed together, FIG. 3A and FIG. 3B show that the leakage power of a variant is directly related to its delay. Variants with higher leakage power (e.g., V_1) generally have a low amount of delay (i.e. they are faster). Variants with lower leakage power (e.g., V_15), have a higher amount of delay (i.e. they are slower).

Figure 3C:
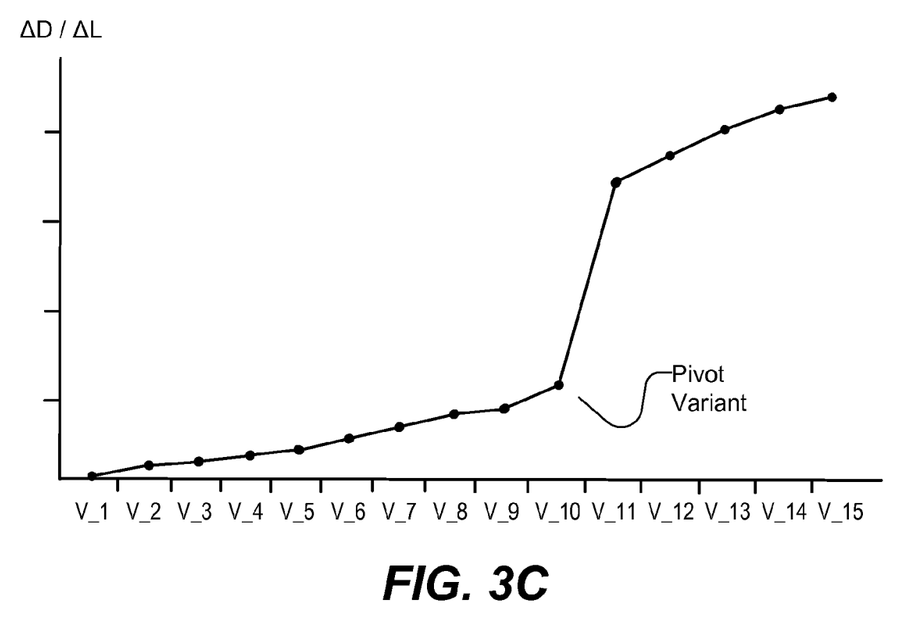
FIG. 3C illustrates one embodiment of a delay-leakage curve for a standard cell with fifteen variants.

Referring now to FIG. 3C, illustrated is a delay-leakage response curve for the fifteen cell variants of FIG. 3A and FIG. 3B according to an embodiment. As shown, the fifteen different variants of a standard cell, V_1 through V_15, are displayed along the X-axis of the graph. The Y-axis represents the ratio of the change in delay ($\Delta D$) for a variant to the change in the leakage ($\Delta L$) for the variant. For a variant N, the change in delay can be computed as the difference in delay between the variant N and the first variant (e.g., V_1). For a variant N, the change in leakage can be computed as amount of the difference in leakage between the variant N and the first variant (e.g., V_1).

The response curve of FIG. 3C is fairly continuous. However, there is a large jump in the response curve between variant V_10 and variant V_11. In other words, the difference in the response curve between V_10 and V_11 is larger than the difference between any other pairs of adjacent variants in the response curve. This discontinuity indicates that there is a large increase in the amount of delay between V_10 and V_11 without a corresponding decrease in the amount of leakage power. It is thus not desirable to use the V_11 variant in a circuit design because the benefit of using the cell (i.e., slightly lower leakage power) is offset by the cost of using the cell (i.e. much higher delay).

The variant V_10 that precedes the largest discontinuity in the response curve is considered the pivot variant. A pivot variant can be viewed as a variant that is more power efficient from a delay and power leakage perspective than its corresponding variants. It is thus beneficial to use the pivot variant in a circuit design because it provides a good balance between delay and power leakage. In one embodiment, the pivot point can be calculated from the maxima of the function whose dependent variable is a derivative of the delay with respect to leakage and the independent variable is the leakage of a cell. The pivot cell is the cell closest to the maxima of the function.

In one embodiment that will be described in conjunction with FIG. 6A, instances of the pivot variants are swapped into a circuit design, which creates timing violations. To correct the timing violations, the pivot variants may be subsequently replaced with higher delay variants during a path-based timing analysis of the IC design.

Figure 4:
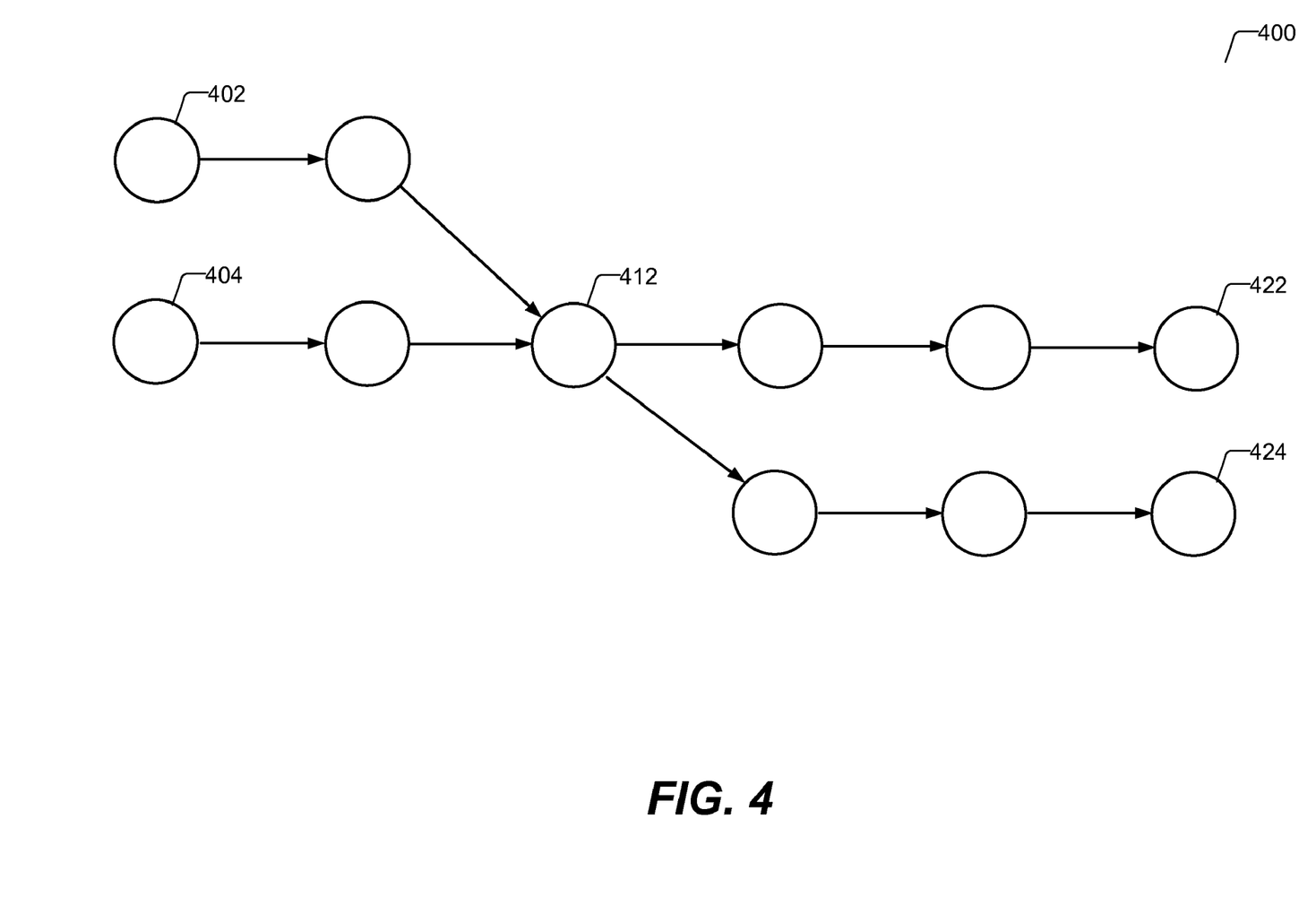
FIG. 4 illustrates one embodiment of signal paths in a cell-based IC design according to an embodiment.

Turning now to FIG. 4, illustrated are paths in an abstract view of a cell-based IC design 400 according to an embodiment. As shown, a cell-based IC design includes a plurality of cells (e.g., 402-424), shown as circles in FIG. 4. The cells are meant to represent any type of cell, such as NAND gates, NOR gates, flops, etc. The connections between the cells form signal paths, and each signal path has an origination point and an endpoint. For example, one path exists between origination point 402 and endpoint 424. Another path exists between origination point 404 and endpoint 422. Both paths pass through a common cell 412.

Each path through the integrated circuit can be associated with a slack value that indicates whether the path meets or violates timing requirements specified for the circuit design. In one embodiment, a slack represents whether the path can operate at a desired speed. In one embodiment, the slack is computed as the difference between an arrival time and a required time. The arrival time is the amount of time it takes for a signal to reach the endpoint (e.g., 422) of a path from the origination point (e.g., 404) of the path. Arrival time can be determined, for example, as a function of the delay characteristics for each of the cells in a path, along with other factors. The required time is a parameter that represents the latest time at which a signal can arrive without making a clock cycle of the circuit design longer than desired and may be set to some pre-determined value.

The slack of a path is generally positive or negative. A positive slack indicates that a signal traveling along the path reaches the endpoint before the required time. The propagation delays of a path with positive slack can be increased without affecting the desired speed of the IC design. A negative slack indicates that a signal traveling along the path reaches the endpoint after the required time. A path with negative slack is too slow and should be sped up if the entire IC design is to work at the desired speed.

Figure 5A:
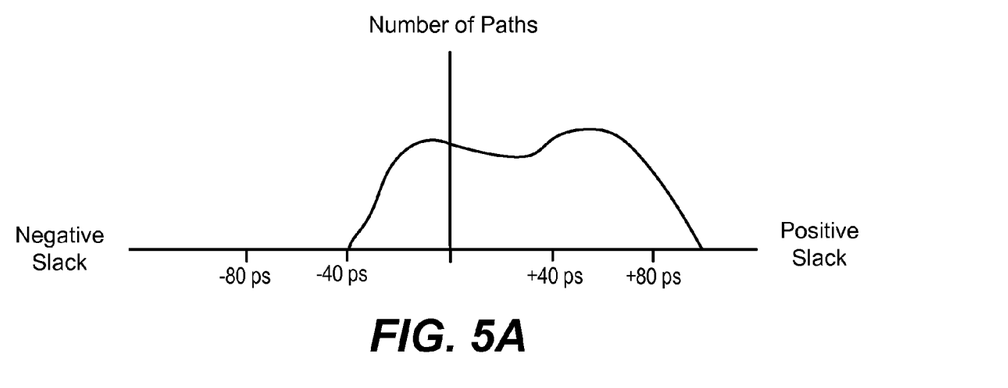
FIGS. 5A-5C illustrate one embodiment of histograms of slack values for the paths of an IC design.
Figure 5B:
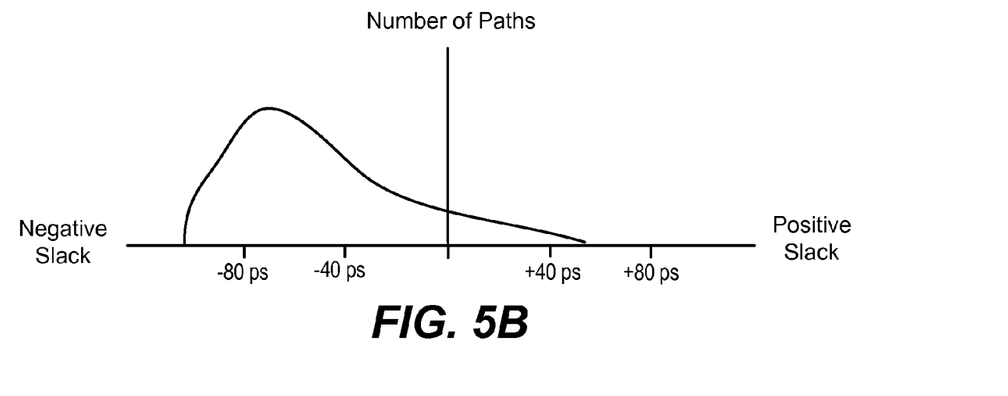
Figure 5C:
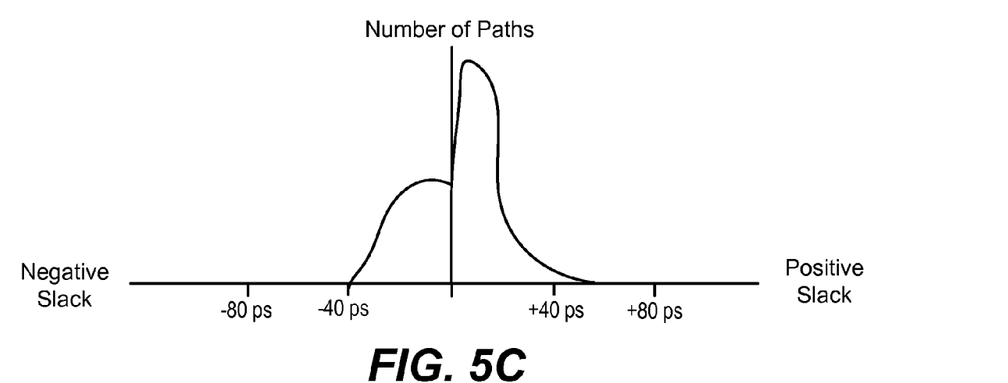

Referring now to FIG. 5A-5C, illustrated are histograms of slack values for the paths of an IC design according to an embodiment. In one embodiment, an IC design is received that has at least some paths with positive slack. The cells in the IC design are swapped for footprint equivalent variants of the cells, which converts the positive slack for the paths into negative slack, thereby breaking the timing of the design. Timing is then recovered (i.e., negative slack converted back to positive slack) by swapping instances of cells in the IC design with lower delay variants that have higher leakage power.

FIG. 5A illustrates the slack of the paths in an IC design that is received by the EDA software 212. For example, the IC design may be generated by the EDA software 212 during the physical implementation 224 stage and include the placement for the cell instances of the design and signal routing between the cell instances. As shown, the X-axis represents the amount of positive or negative slack of a path. The Y-axis represents the number of paths having a particular amount of slack. Most of the paths in this IC design have a positive slack in the range of zero and 80 picoseconds. The remaining paths in this IC design have a negative slack in the range of zero and negative 40 picoseconds. Although there is some negative slack in this IC design, it should be noted that some negative slack is typically permitted in an IC design.

FIG. 5B illustrates the slack of paths in the IC design after the timing of the signal paths is broken. In one embodiment, timing is broken by swapping cells in the IC design of FIG. 5A with pivot variants. Swapping the cells of an IC design to pivot variants ensures that the IC design strikes an efficient balance between power consumption and operational speed. Paths that still have positive slack after the initial swap have their cell instances swapped again for higher-delay but lower-leakage variants in an attempt to remove any positive slack from the IC design. As shown in FIG. 5B, most of the paths in the resulting IC design now have a negative slack when compared to the histogram of FIG. 5A. Some paths may have a positive slack that cannot be eliminated, even after all the cells in the path are replaced with low leakage variants. In another embodiment, replacing the cell instances of an IC design to break the timing may result in elimination of all positive slack in the design.

FIG. 5C illustrates the slack of paths in an IC design after the timing of paths through the IC design is recovered. Timing is recovered by selectively replacing cells in the IC design represented by FIG. 5B with variants having lower delay but higher power leakage. As shown in FIG. 5C, paths that originally had a negative slack in FIG. 5A have their slack restored to at least their original negative slack values. Other paths that originally had positive slack in FIG. 5A have their slack restored to at least zero slack—i.e., negative slack is removed from these paths. In other embodiments, the slack of all paths may be increased to at least zero slack regardless of whether the paths originally had negative or positive slack.

The delay and power leakage adjusted IC design represented by the histogram of FIG. 5C thus has lower overall power leakage than the original design represented by FIG. 5A without reducing the overall speed of the IC design. Additionally, by breaking and then correcting timing of a circuit design in a two step process, the disclosed embodiments are up to 25-40% more effective than conventional power optimization solutions in reducing power leakage. The process of breaking and recovering timing as illustrated in FIGS. 5A, 5B and 5C is described in more detail by reference to FIG. 6A.

Figure 6A:
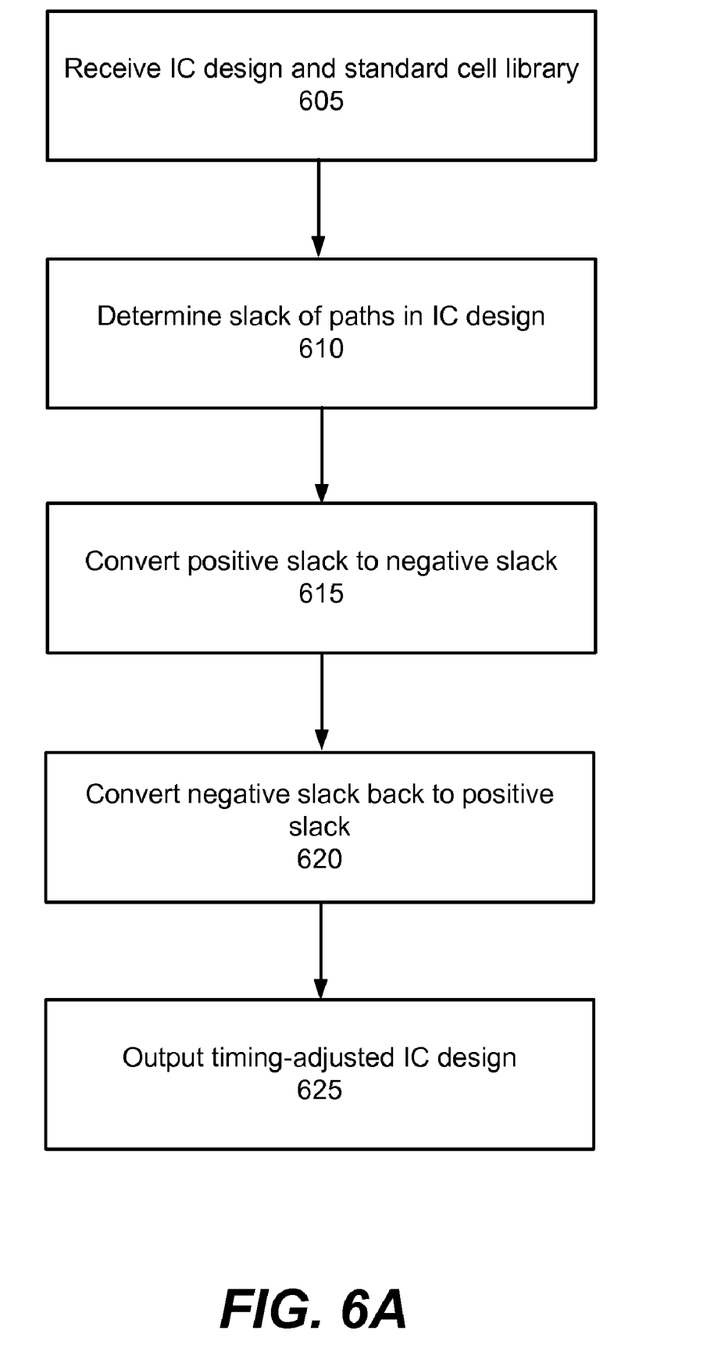
FIGS. 6A-6B illustrate one embodiment of a process for breaking and recovering timing performed by EDA software.

FIG. 6A is one embodiment of a process for breaking and recovering timing performed by the EDA software 212. In step 605, the EDA software 212 receives a design for an IC and a standard cell library. For example, the IC design may be stored in a computer readable medium and retrieved for processing, or the IC design may be received from a program that generates the IC design. The IC design includes multiple cells instances that are connected together with chip-level traces for implementing a desired functionality of the IC. The configuration of the cells instances and traces form signal paths through the design, and there may be hundreds of thousands of signal paths in a single IC design.

The standard cell library includes several different sets of cell variants. The variants in each set are footprint equivalent so that the variants can be swapped in and out of the IC design without affecting the routing of traces between the cell instances. The variants in each set may have differing power leakage, timing delay, and driver resistance characteristics. These characteristics may vary with design constraints, for example, the manufacturing process and environmental conditions such as the operating voltage and the operating temperature. The characteristics of the variants for each of the different design constraints scenarios may be stored in the cell library in association with the variants.

In step 610, the EDA software 212 determines the slacks of the signals paths in the IC design. In one embodiment, the slack for a path is determined by computing the difference between an arrival time and a required time of signals in the path. Some signal paths in the received IC design may have negative slack, and other signal paths may have positive slack.

In step 615, the EDA software 212 converts the positive slack to negative slack by replacing cell instances in the IC design with corresponding pivot variants selected from the cell library. For example, NAND gates are swapped with pivot variants of a NAND gate, and NOR gates are swapped with pivot variants of a NOR gate. In one embodiment, the EDA software 212 first analyzes the variants in the cell library to identify the pivot variants and then replaces the cell instances in the IC design with the pivot variants. Replacing the cell instances with pivot variants optimizes the tradeoff between delay and leakage for the IC design while maintaining the signal routing of the original IC design. However, replacing the cell instances with pivot variants tends to increase the delay of the IC design, which also reduces the slack of the paths and causes timing violations.

In one embodiment, if any path in the IC design still has a positive slack after the cell instances are replaced with pivot variants, the cell instances in the path are swapped again with variants that have higher delay and lower leakage than the pivot variants to reduce the amount of positive slack in the IC design. Swapping the cells for higher delay variants continues until the positive slack is eliminated from the paths of the IC design, or it is not possible to reduce the positive slack any further.

In step 620, the EDA software 212 converts the negative slack back to positive slack, thereby rectifying any timing violations created in step 615, by swapping cell instances of the IC design with variants that have lower delay but higher leakage power. The EDA software 212 analyzes the IC design on a path-by-path basis, and cells in a selected path may be swapped to lower delay variants to reduce the negative slack based on a replacement value of the cell variants as determined by a cost function. In one embodiment, the cells in the selected path are swapped for lower delay variants until the negative slack for the path is gone or the negative slack for the path is restored to its original level, upon which another path is selected.

In step 625, the EDA software 212 then outputs the revised IC design that is now optimized for delay and leakage. In one embodiment, the EDA software 212 outputs the resulting IC design by storing the IC design to disk or by outputting the IC design to another stage of the EDA process. The resulting IC design can then be used, for example, for fabricating an IC that has lower power consumption than an IC designed via conventional means without any reduction in the speed of the IC.

Figure 6B:
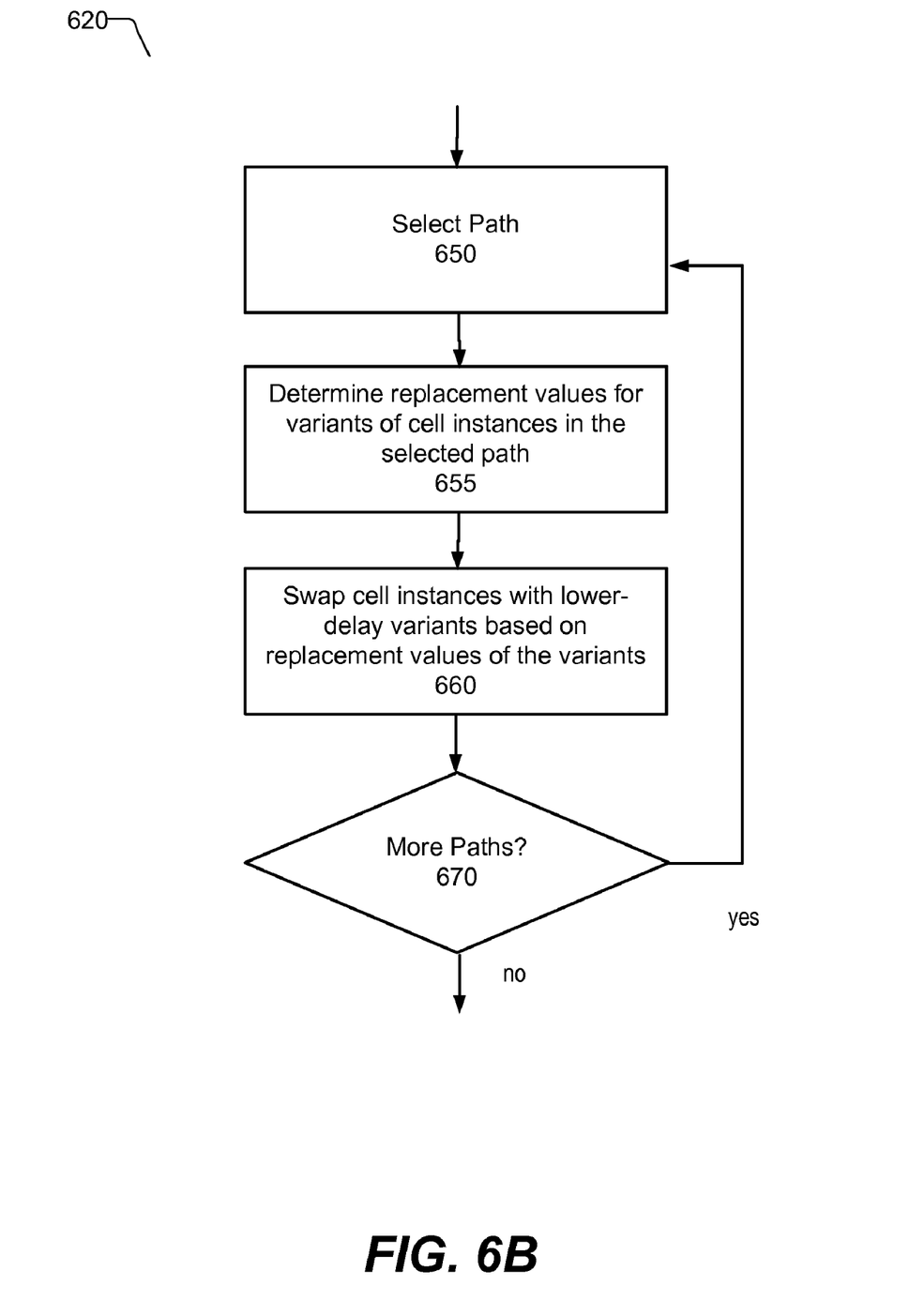

Turning now to FIG. 6B, illustrated is a more detailed view of step 620 from FIG. 6A. As shown, the step 620 of recovering timing can be sub-divided into several sub-steps. In step 650, the EDA software 212 selects a path of the circuit design that has negative slack. In one embodiment, the path in the IC design with the worst negative slack (WNS), i.e. has the largest amount of negative slack, is selected.

In step 655, for a cell instance that is currently swapped into the path (the "current cell"), separate replacement values are determined for the variants of the current cell (the "target variants"). A replacement value for the target variant may be a score that indicates how efficient it would be from a delay-leakage perspective to swap an instance of the target variant into the IC design in place of the current cell. The replacement value may reflect how replacing the current cell affects the delay and leakage of not only the selected path, but also other paths in the circuit design. The EDA software 212 proceeds in this manner to determine, for each cell that is currently swapped into the path, replacement values for the variants of each cell with respect to the current cell.

In one embodiment, the replacement value for a target variant is computed with the following equation:

$$\text{Value} = \text{Bottleneck} \times \frac{\sum_{i=1}^{k} \frac{Delay_i \times \Delta R_i}{R_i}}{\Delta \text{Leakage}} \quad (1)$$

Where Value is the replacement value of the target variant. Bottleneck is the sum of the slacks of the paths passing through the current cell. In some embodiments, the maximum number of paths used in computing the bottleneck cost may be limited, for example, to no more than 360,000 paths. The letter i represents an operating scenario, which is defined by the constraints such as process, voltage, and temperature corners. There are a total of k scenarios. Delay is the delay of the target variant. R is the driver resistance of the target variant. Δ R represents the change in the driver resistance if the current cell is swapped to the target variant, and is computed as the difference between the driver resistance of the current cell and driver resistance of the target variant. Δ Leakage represents the increase in leakage if the current cell is swapped to the target variant, and is computed as the difference between the leakage of the current cell and the leakage of the target variant.

In one embodiment, the cost of the target variant may also be affected by other factors, such as the fanout of the current cell. Fanout refers to the number of other cells that have their inputs driven by the output of the current cell. In one embodiment, a high fanout is treated as a negative factor that decreases the replacement value.

Figure 7:
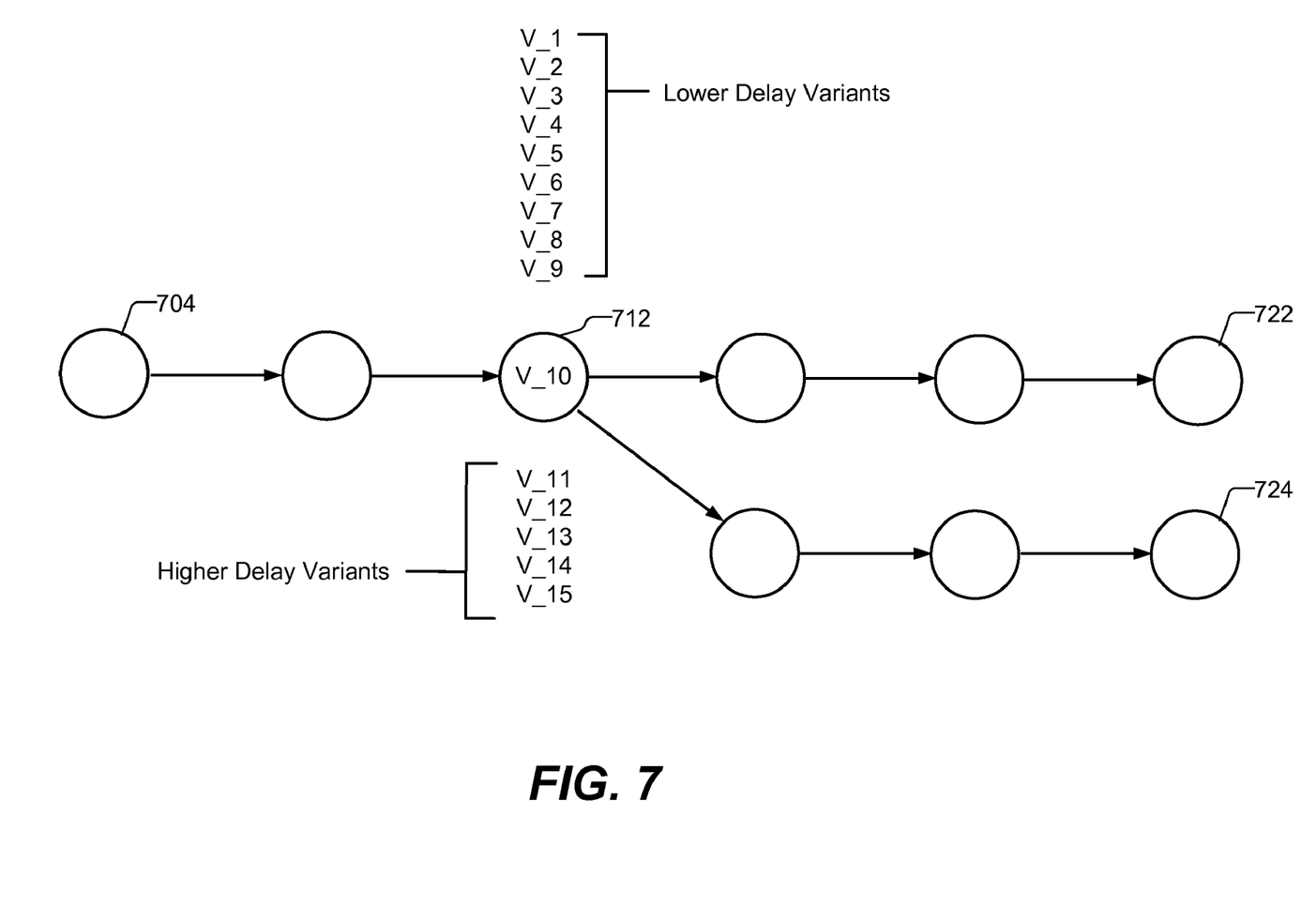
FIG. 7 illustrates one embodiment of signal paths in a cell-based IC design according to an embodiment.

Referring now to FIG. 7, illustrated are the paths through an IC design according to an embodiment. FIG. 7 is similar to FIG. 4, but additional details are added to explain how replacement values are computed for the variants of a cell. In particular, cell 712 has several variants, represented by the notations V_1 through V_15. The variant of the cell 712 that is currently swapped into the IC design is variant V_10. Some of the variants, such as V_1 through V_9 have lower delay and higher leakage characteristics than variant V_10. Some of the variants, such as V_11 through V_15 have higher delay and lower leakage characteristics than variant V_10. The other cell instances also have variants, but for purposes of illustration, the variants of the other cell instances are not shown in the figure.

An example is now provided for computing the replacement value of variant V_9 with respect to cell 712 according to equation (1). The Bottleneck cost is the combined sum of the slacks for each of the paths passing through the cell 712 (e.g., 704 to 722 and 704 to 724). The Delay, for a particular operating scenario i, is the delay associated with cell V_9. R is the driver resistance of variant V_9. Δ R is the difference between the driver resistance of variant V_9 and variant V_10. Δ Leakage is the difference between the leakage power of V_9 and V_10.

For each cell instance in the selected path, separate replacement values are computed for the variants of each cell instance. Thus, if the path between cell 704 and cell 722 is the selected path, individual replacement values are computed for the variants of each cell instance in the path between cell 704 and 722.

Referring back to FIG. 6B, at this point, the EDA software 212 has determined, for each cell instance in the selected path, replacement values for the variants of those cells. In step 660, the EDA software 212 now replaces one or more cell instances in the selected path with lower-delay variants based on the replacement values of the cell variants. In one embodiment, the variant in the path with the highest replacement value is swapped into the IC design to increase the slack of the selected path. The highest replacement value indicates that it is more efficient to swap this variant into the path than it is to swap other variants into the path. Swapping in variants based on their replacement values allows the variants in a path to be weighed against each other for delay and leakage simultaneously in determining how to recover the timing of a circuit design. Because a cell instance may be a part of more than one path, swapping in the variant not only increases the slack of the selected path, but also has the benefit of increasing the slack of any path that the cell instance belongs to. In one embodiment, if the selected path still does not have positive slack after the first swap, the variant with the next highest replacement value may be swapped into the IC design until the selected path has positive slack.

In step 670, the EDA software 212 determines if there are any more paths with negative slack that should be converted into positive slack. If so, another path is selected and steps 650-660 are repeated. In one embodiment, the EDA software 212 identifies a path with the WNS and selects a path with the WNS when repeating steps 650-660. In some embodiments, the process repeats until a terminating condition is reached, for example, until all the paths that originally had positive slack have their slack converted back to negative slack and/or all the paths that originally had negative slack have their slacks restored at least to their original levels, or a user input is received that terminates the process, or any other terminating condition. Once the process is complete, the circuit design is output in step 625 of FIG. 6A.

In some embodiments, a digital representation that corresponds to a tangible circuit design is thus transformed into another digital representation corresponding to a modified version of the circuit design by swapping the cells of the circuit design. The processes described herein may be embodied as instructions in a non transitory machine readable medium executable by one or more processors to perform this transformation. In some embodiments, the timing of paths through the IC design is broken and then recovered with path-based recovery via the use of a cost function. The advantages of the disclosed embodiments include (1) efficient conversion of positive slack into leakage reduction (2) achieving low leakage while maintaining timing and other quality of results metrics, and (3) avoiding the need for re-routing after leakage recovery by swapping in footprint equivalent cells.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein, such as those performed by the compiler, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to improve the clarity of this disclosure. This description should be read to include one or at least one and the singular also includes the plural unless it is obvious that it is meant otherwise.

Upon reading this disclosure, those of skill in the art will appreciate still additional alternative structural and functional designs for a system for reducing leakage power in integrated circuit designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of reducing leakage power for a cell based circuit design that includes cell instances forming signal paths through the circuit design, the method comprising:
    determining slack values for the signal paths of the circuit design, the slack values indicating that a plurality of the signal paths have positive slack;
    converting the positive slack for the plurality of the signal paths to negative slack by, for each of a plurality of the cell instances of the circuit design, replacing the cell instance with a pivot variant associated with the cell instance, the pivot variant identified from a set of footprint equivalent variants of the cell instance and corresponding to a maxima of a delay-leakage function of the set of footprint equivalent variants;
    converting, by a computer, the negative slack for the plurality of signal paths back to positive slack by iteratively performing the following steps until a terminating condition is reached:
        selecting a signal path of the plurality of signal paths having negative slack;
        determining replacement values for variants of a plurality of the cell instances in the selected path; and
        replacing one or more of the cell instances in the selected path based on the replacement values; and
    outputting a revised circuit design resulting from converting the negative slack back to positive slack.

2. The method of claim 1, wherein a path has positive slack if the path meets timing requirements specified for the path and a path has negative slack if the path violates timing requirements specified for the path.

3. The method of claim 1, wherein the replacement value for each variant is determined based on a delay of the variant.

4. The method claim 1, wherein the replacement value for each variant is based on a leakage of the variant.

5. The method of claim 4, wherein the replacement value for each variant is determined based on a difference between the leakage of the variant and a leakage of one of the cell instances in the selected path that corresponds to the variant.

6. The method of claim 1, wherein the replacement value for each variant is determined based on a resistance of the variant.

7. The method claim 1, wherein a replacement value for a variant of the cell instance is determined, the replacement value for each variant is determined based on slack values for one or more paths that pass through one of the cell instances in the selected path that corresponds to the variant.

8. The method of claim 1, wherein the replacement value for each variant is determined based on a fanout of one of the cell instances in the selected path that corresponds to the variant.

9. The method of claim 1, wherein replacing one or more cell instances in the selected path comprises replacing the one or more cell instances in the selected path with one or more of the variants of the cell instances based on the replacement values.

10. A non-transitory machine readable medium storing executable computer program instructions for reducing leakage power of a cell based circuit design that includes cell instances forming signal paths through the circuit design, the instructions comprising instructions for:
    determining slack values for the signal paths of the circuit design, the slack values indicating that a plurality of the signal paths have positive slack;
    converting the positive slack for the plurality of the signal paths to negative slack by, for each of a plurality of the cell instances of the circuit design, replacing the cell instance with a pivot variant associated with the cell instance, the pivot variant selected from a set of footprint equivalent variants of the cell instance and corresponding to a maxima of a delay-leakage function of the set of footprint equivalent variants;
    converting the negative slack for the plurality of signal paths back to positive slack by iteratively performing the following steps until a terminating condition is reached:
        selecting a signal path of the plurality of signal paths having negative slack;
        determining replacement values for variants of a plurality of the cell instances in the selected path; and
        replacing one or more of the cell instances in the selected path based on the replacement values; and
    outputting a revised circuit design resulting from converting the negative slack back to positive slack.

11. The machine readable medium of claim 10, wherein a path has positive slack if the path meets timing requirements specified for the path and a path has negative slack if the path violates timing requirements specified for the path.

12. The machine readable medium of claim 10, wherein the replacement value for each variant is determined based on a delay of the variant.

13. The machine readable medium of claim 10, wherein the replacement value for each variant is based on a leakage of the variant.

14. The machine readable medium of claim 13, wherein the replacement value for each variant is determined based on a difference between the leakage of the variant and a leakage of one of the cell instances in the selected path that corresponds to the variant.

15. The machine readable medium of claim 10, wherein the replacement value for each variant is determined based on a resistance of the variant.

16. The machine readable medium of claim 10, wherein a replacement value for a variant of the cell instance is determined, the replacement value for each variant is determined based on slack values for one or more paths that pass through one of the cell instances in the selected path that corresponds to the variant.

17. The machine readable medium of claim 10, wherein the replacement value for each variant is determined based on a fanout of one of the cell instances in the selected path that corresponds to the variant.

18. The machine readable medium of claim 10, wherein replacing one or more cell instances in the selected path comprises replacing the one or more cell instances in the selected path with one or more of the variants of the cell instances based on the replacement values.

* * * * *